United States Patent
Kalkstein et al.

(10) Patent No.: US 6,550,750 B1
(45) Date of Patent: Apr. 22, 2003

(54) APPARATUS FOR PRODUCING FOAMABLE COMPOSITIONS AND OTHER COMPOSITIONS

(76) Inventors: David Kalkstein, 53 E. Logan St., Philadelphia, PA (US) 19144; John Edward Balkiewicz, 1240 Woodedway, Pottstown, PA (US) 19464

( * ) Notice: Subject to any disclaimer, the term of this patent is extended or adjusted under 35 U.S.C. 154(b) by 0 days.

(21) Appl. No.: 09/695,767

(22) Filed: Oct. 25, 2000

Related U.S. Application Data

(60) Division of application No. 09/132,025, filed on Aug. 10, 1998, now abandoned, which is a continuation-in-part of application No. 08/853,517, filed on May 9, 1997, now abandoned.

(51) Int. Cl.[7] .............................. B01F 3/04; B01F 17/30; B05B 7/04
(52) U.S. Cl. ................................. 261/76; 261/DIG. 26; 239/433; 239/434; 252/3; 252/8.05; 516/11; 516/16
(58) Field of Search ........................... 261/76, DIG. 26; 239/433, 434

(56) References Cited

U.S. PATENT DOCUMENTS

| | | | |
|---|---|---|---|
| 998,762 A | * 7/1911 | Faller | 261/DIG. 26 |
| 1,238,633 A | * 8/1917 | Caldwell | |
| 2,151,398 A | 3/1939 | Weissenborn et al. | 516/16 |
| 2,164,153 A | * 6/1939 | Friedrich | 261/76 |
| 2,618,594 A | 11/1952 | Kalkstein | 252/8.05 |
| 3,486,862 A | * 12/1969 | Unterstenhoefer | 261/DIG. 26 |
| 3,801,015 A | * 4/1974 | Hayes | 261/DIG. 26 |
| 3,849,315 A | 11/1974 | Chiesa, Jr. | 252/3 |
| 4,038,037 A | * 7/1977 | Wilmsen | 261/DIG. 26 |
| 4,086,331 A | 4/1978 | Neumann | 424/45 |
| 4,099,574 A | 7/1978 | Cooper et al. | 252/3 X |
| 4,594,167 A | 6/1986 | Kobayashi et al. | 252/3 X |
| 4,999,119 A | 3/1991 | Norman et al. | 252/3 |
| 5,207,932 A | 5/1993 | Norman et al. | 252/3 |
| 5,492,655 A | * 2/1996 | Morton et al. | 261/76 |
| 5,961,047 A | * 10/1999 | Kleinberger | 239/433 X |

* cited by examiner

Primary Examiner—Richard D. Lovering

(57) ABSTRACT

An apparatus for making a long lasting foam. The apparatus includes an injection chamber, an expansion chamber and a coiled hose which extends therebetween. The coiled hose includes a plurality of turns. A pressure generating pump is provided to force a stream of a foam solution into the injection chamber where it is mixed with a pressurized stream of air and passed through the injection chamber, through the coiled hose, and through the expansion chamber in order to yield a foam having desirable stability and expansion characteristics.

4 Claims, 1 Drawing Sheet

APPARATUS FOR PRODUCING FOAMABLE COMPOSITIONS AND OTHER COMPOSITIONS

RELATED APPLICATIONS

This application is a divisional of pending U.S. application Ser. No. 09/132,025, filed on Aug. 10, 1998, and now abandoned, which is a continuation-in-part of U.S. patent application Ser. No. 08/853,517, filed on May 9, 1997, and now abandoned.

FIELD OF THE INVENTION

This invention relates to a method and apparatus for producing foamable compositions and a method for making the same. More particularly, the invention relates to such a foamable composition which, when mixed with suitable amounts of air and water, produces a compressed air foam which is sufficiently stable to be used as an effective daily cover for landfills. The invention also relates to an apparatus designed to produce a compressed air foam from the foamable composition.

The invention further relates to a method and apparatus for mixing different materials for producing compositions other than foamable compositions.

BACKGROUND OF THE INVENTION

Pursuant to federal, state and local laws, municipal solid waste (MSW) landfills are required to be covered by an earthen or other approved cover for wastes deposited therein at the close of each working day. The use of earthen material as a cover imposes two significant costs on the landfill operator. First, the material must be purchased and, even when available on site, must be physically transported to the landfill and then spread evenly over the compacted trash. The transporting of the earthen material requires large and expensive earth moving equipment as well as substantial man power. Secondly, the earthen material takes up valuable volume which could otherwise be sold to customers. More specifically, the use of earthen material can consume as much as 15 to 20 percent of landfill volume. This deprives the landfill operator of significant potential revenue and profit. Further, the landfill capacity wasted by the earthen material reduces the useful life of the facility, thereby resulting in the need for landfills of increased size or the development of new sites.

Accordingly, there is a need for a material which can be used to effectively cover a landfill without requiring expensive purchase and/or transportation costs. Further, there is a need for such a material which does not consume substantial amounts of valuable landfill volume. Such a material would significantly reduce the operating costs for the approximately 3000 landfills in the United States alone as well as the thousands of landfills abroad.

In recognition of the foregoing, a number of states have allowed foams to be used as covers if they meet certain statutorily provided requirements. For example, the covers must prevent the emission of certain volatile organic compounds and odors. The covers must also prevent the dispersal of loose trash at the landfill site and its vicinity. Foams replace the aggregate material in earthen materials with air. Thus, the use of foams as covers for landfills in place of the earthen material is desirable in that the foams do not take up as much volume as the earthen material and, therefore, are of economic value to the landfill operator. Moreover, such foams are typically less costly and easier to apply than other alternative daily cover methods or products.

Various air foam compositions have been in use for fire fighting purposes for many years. Examples of such foam compositions are disclosed in U.S. Pat. Nos. 3,849,315, 4,099,574, 4,594,167, 5,207,932, and 5,225,094. Three prevalent fire fighting foam compositions comprise either partially hydrolyzed protein, detergents or film forming foam compositions based on perfluorinated hydrocarbons. The detergent foams are generally used as high expansion systems for rapidly flooding large spaces in order to extinguish fires in warehouses, hangers or the like. The perfluorinated hydrocarbon based foams, known as aqueous film forming foams (AFFF), are useful for rapidly spreading an extinguishing film over a burning liquid. Protein based air foam systems provide stable extinguishing foams of relatively greater stability and a practical expansion factor of 10 when used in a 3 or 6% by volume solution of the foam producing composition in conjunction with typical foam generating apparatus.

None of the existing foam systems mentioned above can be used effectively as a daily cover for municipal solid waste (MSW) landfills. More specifically, such foam systems do not remain stable for the period between the day's end of disposal operations and the beginning of the operations the following day. Further, such existing foam systems have expansion factors which are not adequate for use on landfills.

An additional problem with existing foam systems is that the apparatus utilized to discharge the foam fail to provide a sufficiently reliable discharge pattern or distance, thereby necessitating the use of costly additional equipment.

Air foams, protein or film forming types, produced with aspirating discharge nozzles, as are common in the fire protection industry, generally have an expansion factor of 10. This is the case with both 3 and 6% by volume solutions. The injection of compressed air into the foam solution instead of drawing air in by way of aspirating nozzles has been seen to raise the expansion factor to about 15. In most systems that utilize compressed air injection, the foam thus created is forced by pressure through a series of screens within a chamber. As the foam is passed through these screens, bubbles in the foam are reduced in size. A drawback with this process is that some of the fragile foam bubbles are destroyed as they pass through the screens. This reduces the amount of foam produced and, therefore, the expansion factor.

An additional drawback with the process described above is that the velocity of the foam as it is discharged is reduced as it passes through the systems due to contact with the series of screens. This results in a tube like stream of foam being created. When this tube like stream is discharged into the air, the tube like shape is maintain, thereby limiting the foam's exposure to air. The limited air exposure has an adverse impact on the expansion factor of the foam.

Summary of the Invention

The present invention is designed to overcome the deficiencies of the prior art discussed above. It is an object of the present invention to provide a foamable protein composition which, when mixed with suitable amounts of air and water, produces a foam which remains stable for an extended period of time.

It is a further object of the invention to provide such a foamable composition which is relatively inexpensive to manufacture.

It is still another object of the invention to provide a method and apparatus for producing an air foam from the foamable composition.

In accordance with the illustrative embodiments, demonstrating features and advantages of the present invention, there is provided a foamable composition which comprises a metal based salt and a hydrolyzed protein. The foamable composition, when mixed with suitable amounts of air and water, produces a foam which is stable for at least about 16 hours and, preferably, for at least about 18 hours and, more preferably, for at least about 24 hours.

Accordingly, the foam provides an effective daily cover for landfills and the like. Further, the foam can be utilized to provide a cover for hazardous and other wastes while such materials are in transit. It can also be used for fire fighting applications where extended stability is required, such as with forest or tire fires. Other applications include utilizing the foam to: insulate freshly poured concrete or agricultural crops; reduce or eliminate odor and other emissions from agricultural waste, apply fertilizer to the leaves of plants.

This invention also provides an apparatus for generating the protein foam from the foamable composition. The apparatus includes an injection chamber, an expansion chamber and at least one coiled hose which extends therebetween. The coiled hose includes a plurality of turns. Pressure generating pumps are provided to draw the foamable composition, which is preferably in liquid form, and water in a proper proportion and force a stream of the resulting foamable solution into the injection chamber where it is mixed with a pressurized stream of air and passed through the injection chamber, through the coiled hose, through the expansion chamber, through a length of hose and finally out a discharge nozzle in order to yield the desired air foam.

The invention further provides a method of preparing the foamable composition described above.

Additionally, the invention defined in the instant claims is also directed to a novel method and apparatus that is useful for mixing different materials to produce compositions other than foamable compositions.

Other objects, features and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred, it being understood that the invention is not intended to be limited to the precise arrangements and instrumentalities shown.

DETAILED DESCRIPTION OF THE INVENTION

Figure 1:
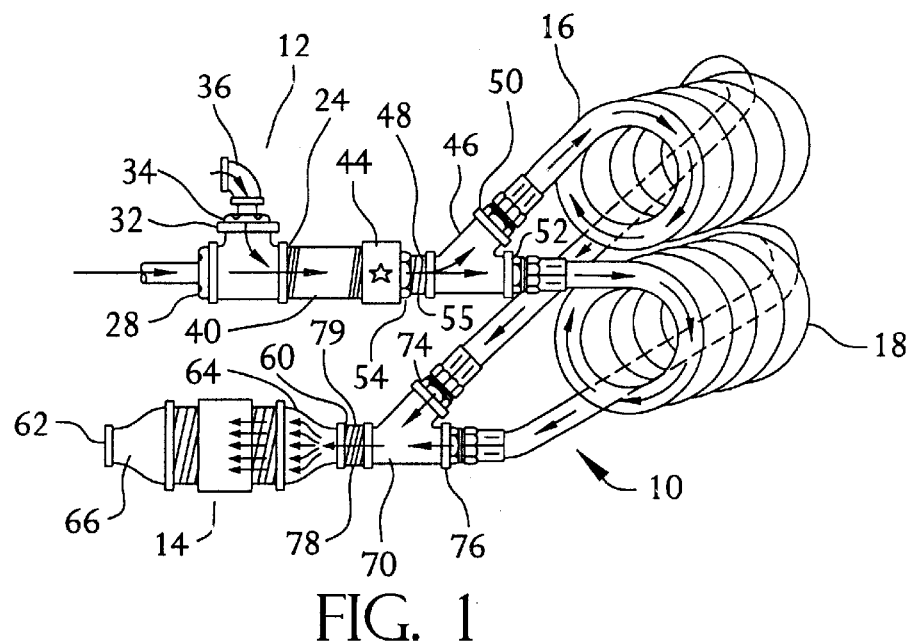
FIG. 1 is a side perspective view of the foam producing apparatus in accordance with the present invention.

Referring now to the drawings in detail wherein like reference numerals have been used throughout the various figures to designate like elements, there is shown in FIG. 1 a foam producing apparatus constructed in accordance with the principles of the present invention and designated generally as 10.

Figure 2:
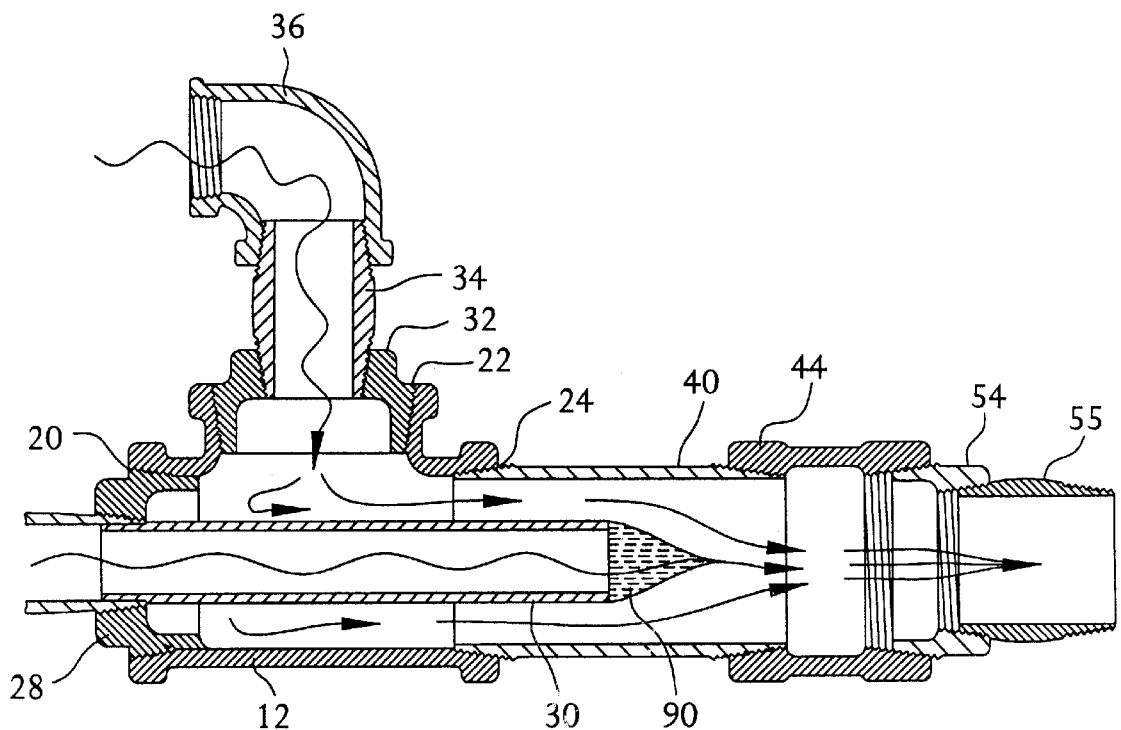
FIG. 2 is a side cross-sectional view of the injection chamber as shown in FIG. 1.

The foam producing apparatus 10 essentially comprises an injection chamber 12, an expansion chamber 14, and first and second hydraulic coiled hoses 16 and 18 extending therebetween. The injection chamber 12 includes first and second inlet openings 20 and 22, respectively, and an outlet opening 24 (FIG. 2). A bushing 28 is preferably threadably secured to and extends outwardly from the first inlet opening 20 of the injection chamber 12. In the preferred embodiment, an elongated tubular member 30 extends into the first inlet opening 20 and passed the outlet opening 24. The bushing 28 secures the tubular member 30 in place. The tubular member 30 preferably has a significantly smaller inner diameter than the inner diameter of the injection chamber 12. In the preferred embodiment, the inner diameter of the injection chamber is approximately 2" and the inner diameter of the tubular member is approximately 0.75".

A bushing 32 is preferably threadably secured to and extends outwardly from the second inlet opening 22. Extending outwardly from the bushing 32 is a tubular member 34 which has an inner diameter of approximately 1". Secured to the free end of the tubular member 34 is an elbow 36. The preferred inner diameter of the elbow is also preferably about 1". Extending outwardly from the outlet opening 24 is a connector segment 40, which has an inner diameter of approximately 2" and is approximately 4" long. The elongated tubular member 30 partially extends into the connector segment 40. A coupling 44 is secured to and extends from the free end of the connector segment 40. The preferred inner diameter of the coupling 44 is also 2". A Y-shaped connector member 46, which includes an input end 48 and first and second output ends 50 and 52, is provided. The connector member 46 preferably has an inner diameter of 1.5". The input end 48 of the Y-shaped connector member 46 is secured to the coupling 44 via a bushing 54 and a 1.5" inner diameter connector 55 as shown in FIG. 1.

The expansion chamber 14 includes an input end 60 and a discharge end 62. The expansion chamber 14 further includes a segment (or bell reducer) 64 which diverges from the input end 60 thereof and a segment (or bell reducer) 66 which converges toward the discharge end 62 thereof. The preferred length of the expansion chamber is approximately 16" and the maximum diameter is approximately 4". A Y-shaped connector member 70, which includes two input ends 74 and 76 and an output end 78, is provided. The output end 78 of the Y-shaped connector member is secured to the input end 60 of the expansion chamber with a 1.5" inner diameter connector 79. The first coiled hose 16 extends between the output end 50 of the Y-shaped connector member 46 and the input end 74 of Y-shaped connector member 70. Similarly, the second coiled hose 18 extends between the output end 52 of the Y-shaped connector member 46 and the input end 76 of the Y-shaped connector segment 70. Each end of the coiled hose is secured an end of a corresponding one of the Y-shaped connector members by means of a bushing. In the preferred embodiment, each of the coiled hoses has an inner diameter of approximately 1", is approximately 8.5" long, and includes five turns. The total distance between the turns of each coiled hose is preferably about 5.75".

The apparatus described above can be effectively used to process a foamable protein composition, which is preferably in liquid form and is comprised of a metal based salt and a hydrolyzed protein, into a long lasting air foam. The apparatus is used to mix the foamable composition with suitable amounts of water and compressed air in order to yield a foam which is stable for at least about 16 hours and, preferably, for at least about 18 hours and, more preferably, for at least about 24 hours. The metal salt is preferably ferrous sulfate and, more preferably, ferrous sulfate heptahydrate crystal. However, other salts, such as ferric iron and aluminum salts could also be utilized. The addition of a salt in a dry, stable form has lead to a reduction in the number of steps required to produce a desired foam composition. The apparatus 10 enhances the performance of existing detergent based foam liquids and concentrates by generating foams with higher expansion factors than typically obtained with prior art machines.

In the preferred method, the foamable composition is obtained by pouring specific amounts of ferrous sulfate heptahydrate crystal ($FeSO_4 7H_2O$) into a solution of hydrolyzed protein while stirring with an appropriate mixer. Various amounts of ferrous sulfate heptahydrate crystal have been found to create a foamable composition in accordance with the present invention. From a practical standpoint, however, it has been found that admixing one part of the ferrous sulfate heptahydrate crystal to approximately 24 parts of hydrolyzed protein results in a liquid foamable composition which has particularly desirable stability characteristics. It has also been found that adding ferrous sulfate until the pH of the mixture fall within the range of from about 6.0 to about 7.0 yields a preferred foamable composition. The addition of the ferrous sulfate in dry form, as opposed to first being added into a solution with water or taking the form of ferric sulfate, results in reduced exposure of the iron in the form of ferrous sulfate to air. This is desirable since the effectiveness of the foam is increased if the exposure to air and the resulting creation of a rust like ferric hydroxide takes place after the foam is discharged. The hydrolyzed protein can be obtained from a number of sources including, by way of example and not limitation, feather meal, animal hide, and hoof and horn meal.

In order to facilitate an understanding of the principles associated with the foregoing apparatus, its operation will now be briefly described. The foamable composition is combined with water and the resultant solution is pumped into the injection chamber 12 through the tubular member 30 by conventional pressure generating means. In the preferred embodiment, the solution comprises 1 part foamable composition and 30 parts water. Air is simultaneously pumped through the elbow 36, through the tubular member 34 and into the injection chamber 12 through the inlet opening 22 therein. The air is pumped in at a higher pressure than solution. Preferably, about 185 cubic feet per minute of air is pumped in under about 85 to about 95 psi while about 4.13 cubic feet per minute of solution is pumped in at about 65 psi.

As the solution is ejected out of the tubular member 30, it combines with the stream of air, which is pumped in at a higher pressure. The air flowing by the end of the tubular member 30 creates an area 90 of negative or lower than surrounding pressure (FIG. 1). As the stream of air passes the end of the tubular member, the solution is drawn into the air stream, thereby mixing the two mediums together. The air infused foam solution is then passed into the Y-shaped connector member 46. Thereafter, a stream of the air infused foam solution is pumped through the output end 50 of the connector member 46 and through the coiled hose 16 while a second stream of the air infused foam solution is forced through the output end 52 of the connector member 46 and through the coiled hose 18. As each stream of solution is spiraled through the respective coiled hoses, a homogenized substance is formed. The infusion of air causes the volume of the solution to expand against the inside of the corresponding coiled hose and turn into a foam. Accordingly, the coiled hoses create a compression zone by retarding the expansion. As the two streams of compressed foam are combined in the Y-shaped connector member 70 and the combined stream is passed into the expansion chamber, the 4.13 cubic feet per minute of solution becomes 185 cubic feet per minute of foam. While the theoretical expansion is 45.79 (4.13 ft$^3$/min (sol.) (185 ft$^3$/min (air)+4.13 ft$^3$/min (sol.))), the actual expansion is typically around 25 to 40 due to energy loss and damage from he discharge hose and nozzle and the coiled hoses (compression coils) 16 and 18.

The foam is discharged from the discharge end 62 of the expansion chamber. In the preferred embodiment, a 1.5" inner diameter hose (not shown), which is equipped with a 1.5" discharge nozzle, extends from the discharge end 66 of the expansion chamber 14. It should be noted that the discharge hose could be branched into two or more smaller discharge hoses or the foam could be discharged by a spray bar or other means. The foam, which is discharged from the discharge nozzle under pressure, has a practical throw of approximately 75 to 100 feet. Further, the resultant stream of foam can be thrown for a substantial distance with considerable accuracy taking the form of a stream of large flake like pieces. This is due to the fact that the spiraling motion of the foam created by the coiled hoses continues past the discharge nozzle up to approximately ⅓ of the discharge distance of the foam. Such spiraling motion and the flake-like form of the discharged foam increases contact of the iron in the foam (ferrous iron) and air (oxygen) which results in the formation of water solution ferric hydroxide. It is ferric hydroxide specifically which provides durability and strength to the bubbles created from proteinaceous matter in the foam composition and which forms the skeleton of the foam's structure. The resultant foam, when applied, has been found to remain stable for up to about 28 hours. Accordingly, the foam has definite utility for covering MSW landfills overnight. Further, it has been found that the useful life of the foam cover can be increased to as long as approximately 60 hours by increasing the thickness of the same.

The resultant foam has other uses. By way of example, the foam can be utilized to provide a cover for hazardous and other wastes while such materials are in transit. It can also be used for fire fighting applications where extended stability is required, such as with forest or tire fires. Other applications include utilizing the foam to: insulate freshly poured concrete or agricultural crops; reduce or eliminate odor and other emissions from agricultural waste, apply fertilizer to the leaves of plants.

PRODUCTION OF OTHER THAN FOAMABLE OR EXPANDABLE COMPOSITIONS

As set forth hereinabove, the invention defined in the instant claims is further directed to a novel method and apparatus that is useful and advantageous for mixing different materials to prepare compositions other than foamable or otherwise expandable compositions.

In particular, the inventive method and apparatus can be used to mix different materials that are not foamable compositions. Such materials, if liquid, can include any water-soluble compound or solution. In addition, solid materials, specifically finely divided powders, can be mixed with either other such material or with liquid compounds or solutions. In this application, inventive method and apparatus can incorporate pumps, compressed gas, Venturi or Pitot methods, or any combination thereof for the purpose of entering constituents of a mixture. The apparatus is not limited to any particular number of such devices, as there is no limit to the number of such devices which may be used with the invention. The use of the instant invention for mixing advantageously enables a processor to proportion dose and mix incoming products on a continuous basis rather than a batch process wherein mixing in conventional vats or other such containers requires time to obtain a mixture. In this contemplated use of the inventive method, a mixture can be obtained with extreme speed by the rapid introduction of compressed gas followed by compression then expansion, as is the process in making foam. In any composition that is not foamable prepared by the inventive method and apparatus the air will dissipate immediately upon discharge from the apparatus leaving the desired mixture to be packaged as appropriate. The production of foam is an example of this inventive process.

The foam-making parameters of the system are constant, i.e., the dilution of foam liquid in solution may always be approximately 3% and the expansion will always be 28–45 times solution volume. Therefore, the capacity of the system can be increased or decreased in linear fashion as a function of compressed air capacity. For example, 185 cfm of compressed air or other gas will yield 924 gallons of foam using 32 gallons of water, and 1 375 cfm system will double this output over any given unit of time.

Agricultural applications of the instant invention include, in addition to those set forth hereinabove, the distribution of any water soluble herbicide, pesticide or other agrochemical product designed for foliar application.

With respect to fire fighting applications, it has been established that the instant inventive foams, as produced by the inventive method and apparatus, resists "bumback" to a degree heretofore unknown and far exceeding that of conventional foams, and will not easily ignite or many times will not ignite at all. This burnback is a process by which fire or heat destroys the cover made by a fire fighting foam and ignites the foam which can be exceedingly dangerous and have disastrous consequences to firefighters.

Without wishing to limit the invention to any particular theory, it is thought that the present inventive method and apparatus produces a novel foam that is much more durable than conventional foams, in part at least due to the foams high metal content ($FeSO_4(H_2O)_3$). The uniquely high bumback resistance of the instant inventive foams simply cannot be achieved by any conventional foams, such as those prepared under military specifications. For example, the instant inventive foams can exhibit bumback time (resistance to bumback) at least about 300% greater than conventional foams.

The present invention may be embodied in other specific forms without departing from the spirit or essential attributes thereof and accordingly reference should be made to the appended claims rather than the foregoing specification as indicating the scope of the invention.

What is claimed is:

1. An apparatus for making a long lasting form comprising:

an injection chamber having an inlet opening and an outlet opening;

hollow coil means having first and second ends, wherein said coil means comprises two coiled hoses, each of said hoses extending between said injection chamber and said expansion chamber;

coupling means for connecting said outlet opening of said injection chamber to said first end of said coil means;

an expansion chamber having an input end and a discharge end, said second end of said coil means being connected to said input end of said expansion chamber, and pressure generating means for passing a quantity of a foam solution through said injection chamber, through said coil means, and through said expansion chamber in order to yield a long lasting foam.

2. The apparatus of claim 1 wherein each of said coiled hoses includes at least about three turns.

3. The apparatus of claim 1 further including an elongated tubular member extending into said injection chamber through said inlet opening thereof, said foam solution passing into said injection chamber through said elongated tubular member.

4. The apparatus of claim 3 wherein said injection chamber further includes an air inlet opening therein and pressure generating means for passing a stream of air over said tubular member and allowing said foam solution to be mixed with said stream of air as said foam solution is ejected from said tubular member.

\* \* \* \* \*